_United States Patent_ [19]

Garavuso et al.

[11] Patent Number: 4,693,594

[45] Date of Patent: Sep. 15, 1987

[54] PLATEN TRANSPORT AND VACUUM PLENUM FOR BOOK COPYING

[75] Inventors: Gerald M. Garavuso, Macedon, N.Y.; Troy Shinbrat, Greenbelt, Md

[73] Assignee: Xerox Corporation, Stamford, Conn.

[21] Appl. No.: 811,195

[22] Filed: Dec. 20, 1985

[51] Int. Cl.⁴ .................... G03B 27/32; G03B 27/52
[52] U.S. Cl. .................... 355/25; 40/531; 355/76
[58] Field of Search .............. 40/531, 532, 470; 355/25, 75, 76

[56] References Cited

U.S. PATENT DOCUMENTS

| 3,484,970 | 12/1969 | Berlinsky et al. | 40/531 |
| 3,550,296 | 12/1979 | Castagna | 40/531 |
| 3,800,453 | 4/1974 | Kroes | 40/531 |
| 3,939,587 | 2/1976 | Weststrom | 40/531 |
| 4,102,071 | 7/1978 | D'Arcy | 40/531 |
| 4,121,361 | 10/1978 | D'Arcy | 40/470 |
| 4,160,334 | 7/1979 | Willis | 40/531 |

Primary Examiner—Richard A. Wintercorn

[57] ABSTRACT

An arrangement for transporting a book facedown onto an and off of a copier includes a platen transport and a belt transport positioned on opposite sides of a vacuum plenum that is used to peel the bottommost page from a book to turn the same as the book is moved back and forth between the transport platen and belt member. As the book moves the vacuum plenum a by predetermined amount, it contacts a roller and is supported on the roller as it is transported onto and off of the platen by the platen transport. The roller reduces the friction between the pages of the book and the platen.

24 Claims, 10 Drawing Figures

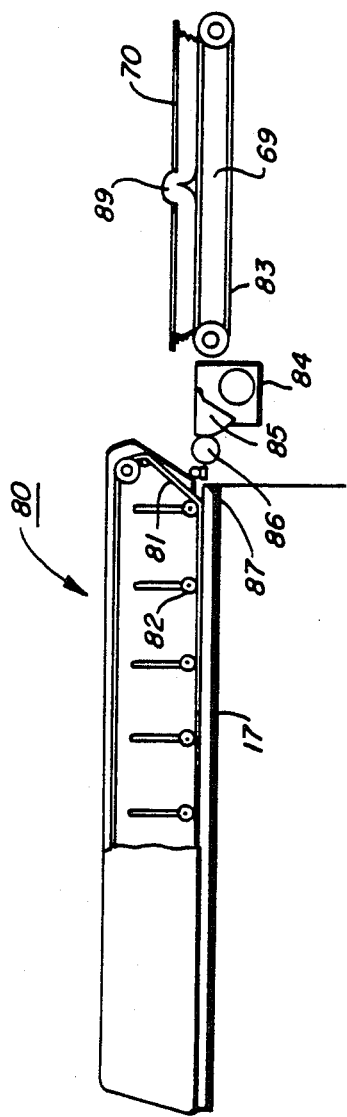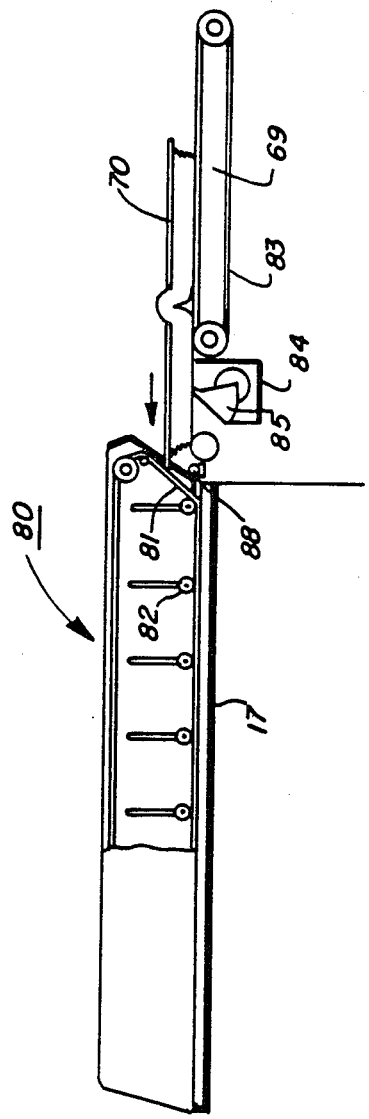

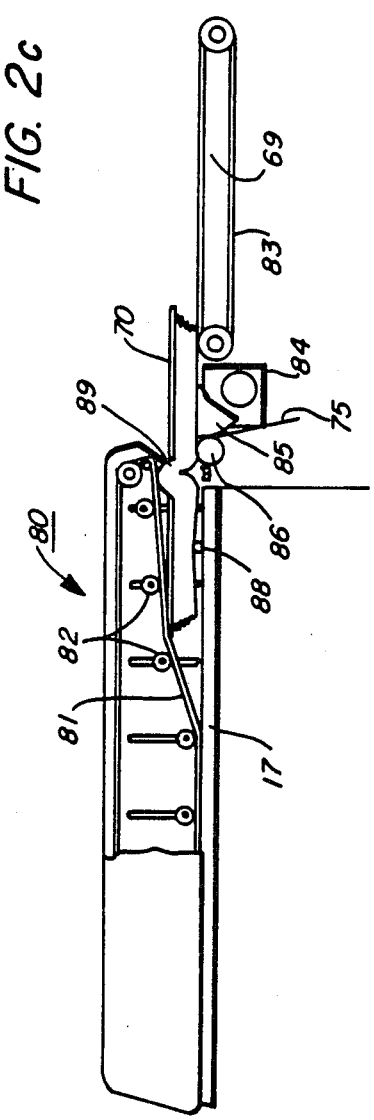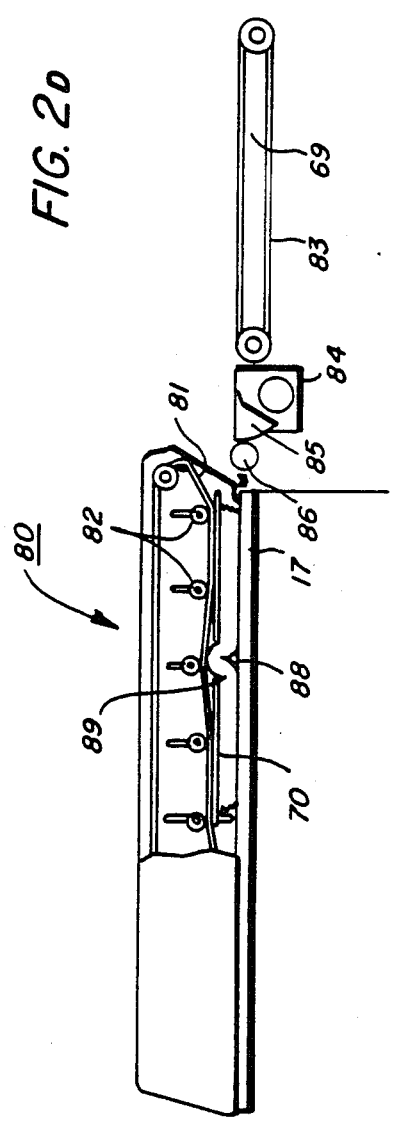

PLATEN TRANSPORT AND VACUUM PLENUM FOR BOOK COPYING

BACKGROUND OF THE THE INVENTION

Reference is hereby made to copending applications Ser. No. 811,194, entitled "Page Flipper for Book Copying", filed on Dec. 20, 1985 in the name of Troy (NMI) Shinbrot; and Ser. No. 811,190, entitled "Frictionless Vacuum Feeder for Book Copying" filed on Dec. 20, 1985 in the name of Troy (NMI) Shinbrot which are incorporated herein by reference.

This invention relates generally to an electrophotographic copying machine, and more particularly, concerns a page turning apparatus for such a copying machine that peels paper from the bottom of a bound volume or book.

Present copier state of the art involves using a recirculating document handler to allow convenient copying of large stacks of original documents. These systems have no page turning arrangement to deal with copying books, magazines, saddle stitched sets, etc. Further, copying of bound documents is a labor intensive task making a device that is adapted to copy bound volumes more and more necessary to control costs, especially as finishing of copies into book volumes becomes more common. There is a clear present need to extend the state of the art to include this book copying segment of the market sector.

PRIOR ART

A number of page turner devices are available, however, they are usually designed to allow persons who are partially immobilized, disabled, or bed-ridden to turn pages of a book at will merely by operation of a switch. These devices are either too bulky, heavy, insufficiently reliable or incapable of being adapted to turn the pages of a book for book copying in a photocopying environment. For example:

U.S. Pat. No. 3,484,970 (Berlinsky et al.)—discloses an automatic sheet turner that uses a rotating vacuum head to grab a page of book and flip it over to the other side. Subsequently, a brush follows the path of the roller and sweeps and smooths out the turned page.

U.S. Pat. No. 3,550,296 (Castagna) and U.S. Pat. No. 3,800,453 (Kroes)—disclose page turner devices in which suction means are used to lift the pages of a book and flip them over.

U.S. Pat. No. 3,939,587 (Weststrom)—discloses a page turner in which a roller is moved from one side of an open book to the other. The unturned pages of the book are kept in position by means of two page retainers.

U.S. Pat. No. 4,102,071 (D'Arcy)—discloses an automatic page turning apparatus in which a roller forces a page of a book to separate and bow upwardly. Once the page reaches a certain position, the roller releases the page which flexes upwardly to be engaged by a band as the band returns to it forward position. Subsequently, blocks move downwardly to force the page to a substantially flat position.

U.S. Pat. No. 4,121,361 (D'Arcy)—discloses an apparatus for automatically turning pages. A roller frictionally pushes an exposed page resulting in an upward bulging of the page, then a first flipper arm and a second flipper arm move under the bulge to assist in flipping the page over toward already turned pages.

U.S. Pat. No. 4,160,334 (Willis)—discloses a reversible page turned in which a roller causes the flipping of pages of a book.

One answer to this facedown book copying problem is disclosed in the heretofore mentioned copending application Ser. No. 811,190. In one aspect of that device, two belt transports are used, one each around two separate platens positioned on opposite sides of a vacuum wheel in order to drive a book back and forth across the vacuum wheel for page peeling purposes. While that device is immediately applicable to a limited copier configuration, modification is required to allow implementation on a traditional glass platen copier.

SUMMARY OF THE INVENTION

Accordingly, in one aspect of the present invention, a method for copying pages from a facedown book is disclosed comprising the steps of:

(a) providing a platen surface for copying pages from the facedown book and a support member in the same plane as said platen surface for supporting the facedown book during forward and backward transport;

(b) providing belt means entrained around said support member for driving the book toward and away from said platen surface;

(c) providing a vacuum plenum positioned between and in the same plane as said platen surface and said support member, said vacuum plenum being adapted to peel a page from a first half of the facedown book as the book is transported past the vacuum plenum by said belt means;

(d) positioning a page flipping assist means immediately adjacent said vacuum plenum for contacting the page peeled from the book by said vacuum plenum and flattening the page against a second half of the facedown book;

(e) providing roller means adjacent to and downstream of said page flipping assist means for engaging the lead edge of the first half of the book after the lead edge has passed the roller means by a sufficient distance, said roller means being adapted to reduce friction between the pages of the book and said platen surface; and (f) providing a transport means for receiving the book from said belt means and transporting the book into position for copying.

BRIEF DESCRIPTION OF THE DRAWINGS

Other advantages of the present invention will become apparent upon reading the following detailed description and upon reference to the drawings, in which:

FIG. 2A is a partial enlarged elevational schematic of the platen transport and vacuum plenum of FIG. 1.

FIG. 2B is a partial enlarged elevational schematic of the platen transport and vacuum plenum of FIG. 1 showing the lead edge of a page of a book being captured by the vacuum plenum.

FIG. 2C is a partial enlarged elevational schematic of the platen transport and vacuum plenum of FIG. 2A showing a roller being used to reduce friction between a platen surface and the book.

FIG. 2D is a partial enlarged elevational schematic of the platen transport and vacuum plenum of FIG. 2A showing the roller being located in the center of the book when the book is in position for copying.

While the present invention will be described hereinafter in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
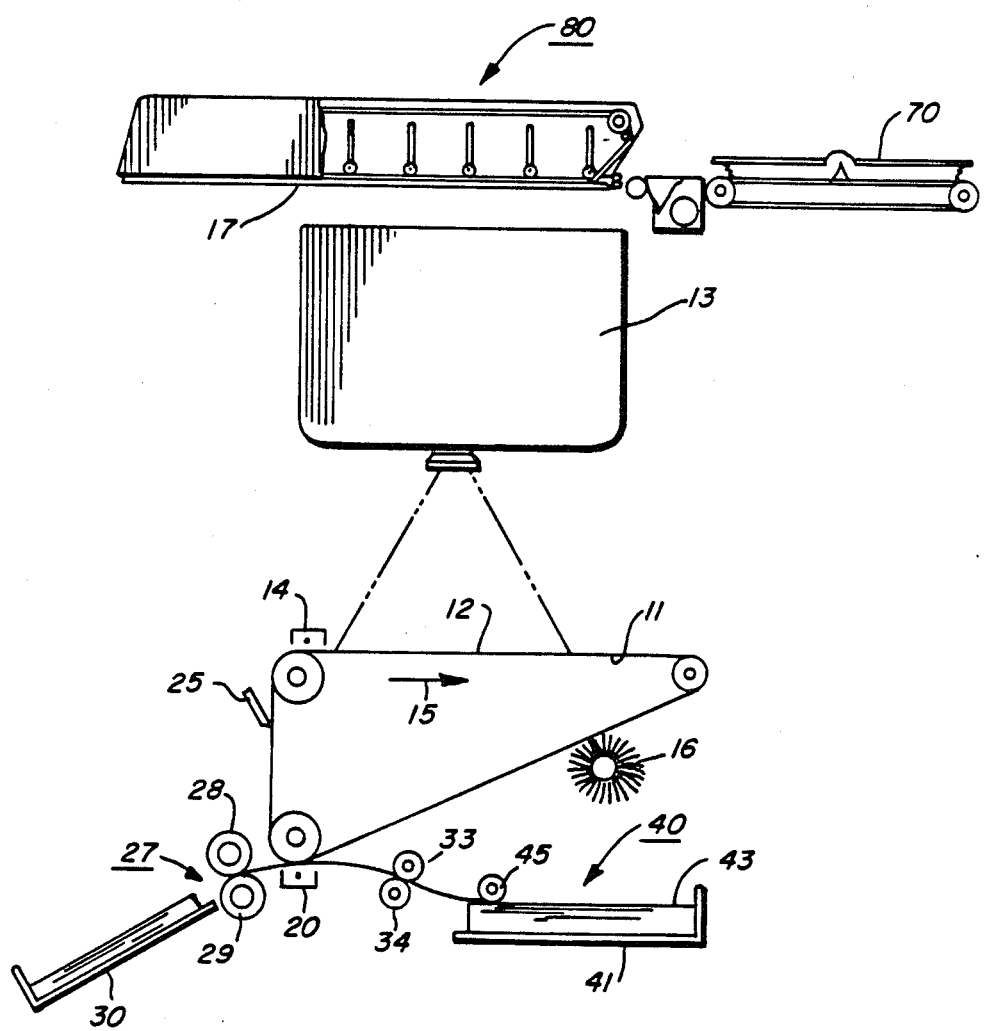
FIG. 1 is a partial schematic elevational view of an electrophotographic copying machine incorporating the platen transport and vacuum plenum of the present invention.

For a general understanding of an electrophotographic printing machine in which the features of the present invention may be incorporated, reference is made to FIG. 1 which depicts schematically various components thereof. Herinafter, like reference numerals will be employed throughout to designate identical elements. Although the apparatus for turning pages within a copier is particularly adapted for use in an electrophotographic copying machine of FIG. 1, it should become evident from the following discussion that it is equally well suited for use in a wide variety of areas and devices and is not necessarily limited in its application to the particular embodiment shown herein. For example, the apparatus of the present invention will be described hereinafter with reference to turning pages in a document for copying with a copier, however, the device could just as well be used for turning pages for reading by an individual who is disabled.

Since the practice of electrophotographic copying is well known in the art, the various processing stations for producing a copy of an original document are represented schematically in FIG. 1. Each processing station will be briefly described hereinafter.

As in all electrophotographic copying machines of the type illustrated, a drum or belt 12 having a photoconductive surface 11 entrained about and secured to the exterior circumferential surface of a conductive substrate is rotated in the direction of arrow 15 through the various process stations. Photoconductive surface 11 may be made from selenium and the conductive substrate on which it is mounted is usually made of aluminum.

Initially, the drum rotates a portion of photoconductive surface 11 through a charging station that employs a corona generating device 14 to charge conductive surface 11 to a relatively high substantially uniform potential.

Thereafter, the drum rotates the charged portion of photoconductive surface 11 to an exposure station shown generally as 13 and includes a stationary, transparent platen, such as a glass plate 17 against which pages of a book to be copied are placed. The glass plate 17 is a part of a compact full frame flash illumination system of the type disclosed in U.S. Pat. No. 4,466,734 which is incorporated herein by reference. In a unitary mode of operation, a lens, mounted within a light housing, projects an image of a document onto photoconductive surface 11.

The electrostatic latent image recorded on photoconductive surface 11 is now rotated toward developing unit 16 which includes a housing with a supply of developer mix contained therein. The developer mix comprises carrier granules with toner particles adhering triboelectrically thereto. Preferably, the carrier granules formed from a magnetic material with the toner particles being made from a suitable plastic. Developing unit 16 is preferably a magnetic brush development system. A system of this type moves the developer mix through a directional flux field to form a brush thereof. The electrostatic latent image recorded on the photoconductive surface 11 is developed by bringing the brush of developer mix into contact therewith. In this manner, the toner particles are attracted electrostatically from the granules to the latent image forming a toner powder image on photoconductive surface 11.

With continued reference to FIG. 1, a copy sheet is advanced by sheet feeding apparatus 40 to a transfer unit 20. Sheet feeding apparatus 40 advances successive copy sheets to registration rollers 33 and 34. Registration roller 34 is driven by a motor (not shown) in the direction of the transfer station and drives idler roller 33 as well as sheets 43 toward photoconductive surface 11 in timed relation to an image on the photoconductive surface 11.

Continuing now with the various processing stations, transfer station 20 includes a corona device for transferring an image from photoconductive surfaced 11 to copy sheet 43. For transfer, the corona generating device applies a spray of ions to the backside of the copy sheet. This attracts the toner powder from the photoconductive surface 11 to the copy sheet.

After transfer of the toner powder image to the copy sheet, the sheet is detacked from the photoconductive surface 11 and then advanced by suitable means to fuser apparatus 27.

Fuser apparatus 27 includes a fuser roll 28 and a backup roll 29 defining a nip therebetween through which the copy sheet passes. After the fusing process is completed, the copy sheet is advanced by suitable means to an output catch tray 30.

After the copy sheet is separated from photoconductive surface 11 some residual toner particles remain adhered thereto. These toner particles are removed from photoconductive surface 11 by a cleaning unit 25. Cleaning unit 25 includes a doctor blade that cleans the toner particles from the photoconductive surface 11.

It is believed that the forgoing description is sufficient for purposes of the present application to illustrate the general operation of an electrophotographic copying machine. Referring now to the specific subject matter of the subject invention, FIG. 2A depicts the book transports and vacuum plenum apparatus in greater detail.

Referring now to FIG. 2A, the detail structure and operation of the unique book platen transport scheme and vacuum plenum apparatus of the present invention shown generally as 80 will be described, As viewed in FIG. 2A, the book 70 is transported onto the leftmost roller 88 by belt 83 that is entrained around support member 69. This roller 88 is engaged once the lead edge of the book 70 has passed it by an appropriate distance. Roller 88 moves with surface speed equal to or just slightly larger than the book's speed. As a result, the roller arrives in the center of the spine of the book just when the trail edge of the book passes the registration point, i.e., the "appropriate distance" mentioned above. Imaging can then take place with a resultant loss of about 3/16 inch space in the book's center due to the presence of roller 88. However roller 88 can be effectively eliminated from printing out on the photoconductive drum by the use of flood lights if such is desired. Also, if the loss of information resulting from the printout of roller 88 is unacceptable, alternative illumination systems can be used such that the book would be stopped after the roller has passed the spine of the book and a copy made of the left hand page in the book, then the book's motion would be reversed, stopped again and then the other unobstructed page could be imaged.

In further reference to FIG. 2A and to FIGS. 2B–2D, book 70 is moved in the direction of the arrow by belts 83 and the lead edge of the bottommost page in the book is captured by a negative pressure applied to vacuum plenum 84 that includes movable vacuum ported flap 85. As book 70 continues to be driven over the vacuum plenum by belts 83 that are entrained around support 69, sheet 75 continues to ride along the downwardly inclined surface of pivoting member 85 and as shown in FIG. 2C, leaves the vacuum plenum after the spine of the book has passed the vacuum plenum and is caused to be flattened against the right hand part of book 70 by a page flipping assist means 86, which in this case is a roller. As the lead edge of the book leaves roller 86, it is supported on friction reducing roller 88 and is meet by a belt transport that includes belts 81 and downwardly biased rollers 82. The rollers as well as the belts are flexible such that as shown in FIG. 3, continued movement of the book toward complete support onto platen 17 causes belt 81 and rollers 82 to ride above the belt as they are driving the book onto the surface of platen 17. It will be seen in FIG. 3D that the book has been completely driven onto platen 17 for exposure purposes and that belts 81 and rollers 82 are riding on top of book 70 and are adapted to drive the book off the platen to the right as viewed in FIG. 3D and to drive the book back onto support member 69 after the pages lying against platen 17 have been copied. Return of book 70 onto platent 69 repositions roller 88 in its holder 87 where the roller is again available for repositioning of the book onto platen 17 again for exposure of additional pages. Roller 88 decreases the friction between the pages of book 70 that are positioned adjacent to platen 17 thereby making transport of the book onto an off of platen 17 easier.

Figure 3A:
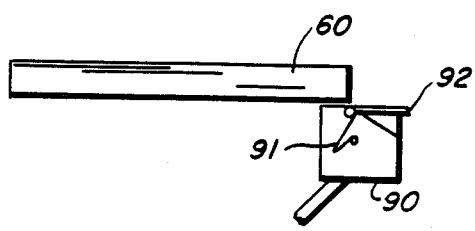
FIG. 3A is a partial enlarged elevational schematic of an alternative embodiment of the present invention showing a vacuum plenum that incorporates a torsion spring for returning a hinged portion of the vacuum plenum to its up position.
Figure 3B:
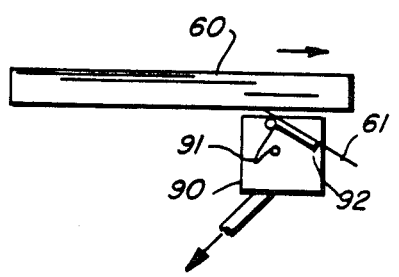
FIGS. 3B–3E are partial enlarged elevational schematics of the invention as shown in FIG. 3A showing the hinged portion of the vacuum plenum in various positions while peeling a sheet from a stack.

An alternative embodiment of the vacuum plenum of the present invention is shown in FIG. 3A that includes a vacuum plenum 90 which includes a hinged movable flap with vacuum ports therein such that when the vacuum ports are obscured by paper, the vacuum itself draws the hinged member 92 down along with the bottom sheet in stack 60. Leakage is obviously minimized once the ports are obscured, therefore, large negative flows are not needed, and the pressure applied to the ports can be set to the pressure needed to bend the stiffest sheet to be fed. This pressure could be adjustable to "fine tune" performance. Hinged member 92 in plenum 90 is returned to its "up" position by a torsion spring 91 as shown in FIG. 3A. It should be understood that an over center design could be employed instead of spring 91 and would require a small pressure change to effect actuation.

Figure 3C:
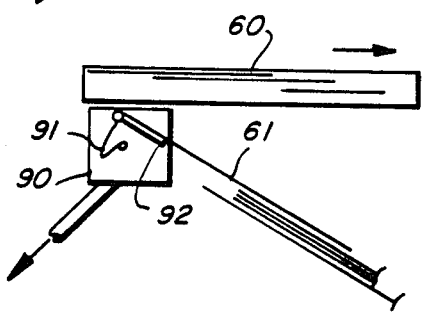
Figure 3D:
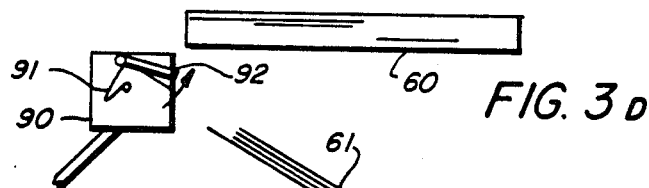
Figure 3E:
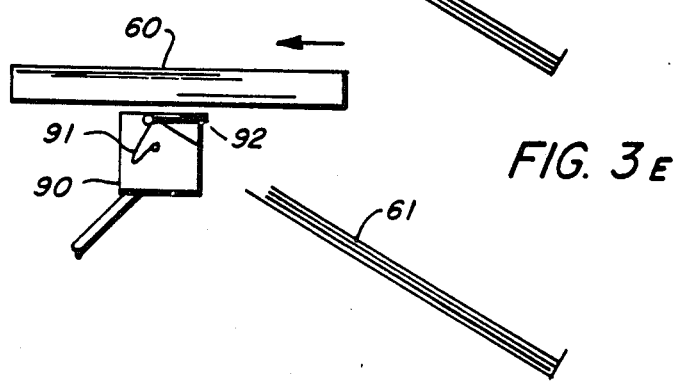

As shown in FIGS. 3B–3E, as a stack of documents or pages 60 are transported past the vacuum plenum 90, a document 61 is captured by a negative pressure applied through the ports of hinged member 92 as shown in FIG. 3C and as the stack 60 continues to move, the bottommost document in the stack rides along the low frictional surface of hinged member 92 and continues until document 61 is completely peeled from the bottom surface of stack 60 and stacked in catch tray 65. A pneumatic assist could be used to help separate the bottommost document from the stack if desired. As shown in FIGS. 3D and 3E, after the document has been completely peeled from stack 60 and is started in its reverse direction, hinged member 92 is forced back to its original position by torsion spring 91 and as shown in FIG. 3E is completely it its original position as the stack is being returned to its original starting position.

It should now be apparent that a unique device and method for copying pages from a facedown book is disclosed and comprises conveyors for transporting a book onto and off of an exposure platen as part of an apparatus that includes a first roller that assists in flipping the pages of the book and flattening them against the opposite side of the book and a second roller adapted to reduce friction between the book and the exposure platen. A vacuum plenum with a hinged face member is included to improve sheet peeling performance. The book is automatically returned to its home position once copying is completed. Since various modifications are contemplated, it is to be understood that within the scope of the appended claims, the invention may be practiced otherwise than is specifically described.

What is claimed is:

1. A method for copying pages from a facedown book, comprising the steps of:
   (a) providing a platen surface for copying pages from the facedown book and a support member in the same plane as said platen surface for supporting the facedown book during forward and backward transport;
   (b) providing belt means entrained around said support member for driving the book toward and away from said platen surface;
   (c) providing a vacuum plenum positioned between and in the same plane as said platen surface and said support member, said vacuum plenum being adapted to peel a page from a first half of the facedown book as the book is transported past the vacuum plenum by said belt means;
   (d) positioning a page flipping assist means immediately adjacent said vacuum plenum for contacting the page peeled from the book by said vacuum plenum and flattening the page against a second half of the facedown book;
   (e) providing roller means adjacent to and downstream of said page flipping assist means for engaging the lead edge of the bottommost page of the first half of the book after the lead edge has passed the roller means by a sufficient distance, said roller means being adapted to reduce friction between the pages of the book and said platen surface; and
   (f) providing a transport means for receiving the book from said belt means and transporting the book into position for copying.

2. The method of claim 1, wherein the book is moved at a predetermined speed and said roller means moves at a speed equal to or slightly larger than said predetermined speed.

3. The method of claim 2, wherein said page flipping assist means is a roller.

4. The method of claim 3, wherein said transport means is adapted to transport the book off said platen surface toward said belt means.

5. The method of claim 4, wherein said transport means includes belt means and moveably biased rollers that urge said belt means against the book during transport.

6. The method of claim 5, wherein said moveably biased rollers are adapted for movement in a vertical plane.

7. The method of claim 2, wherein said roller means is supported within a V-shaped channel of a housing member.

8. The method of claim 1, including the step of providing said vacuum plenum with a hinged page engaging member having vacuum ports in a surface thereof and adapted to rotate between open and closed positions depending on whether a page is attached thereto.

9. The method of claim 8, including the step of providing said page engaging member of said vacuum plenum with a torsion spring that is adapted to continuously bias said page engaging member toward said closed position.

10. The method of claim 9, wherein the vacuum within said vacuum plenum overcomes the bias of said torsion spring and draws said page engaging member down when said ports in said surface of said page engaging member are obstructed by a page in the book.

11. A method for copying pages from a facedown book, comprising the steps of:
   (a) providing a platen surface for copying pages from the facedown book and a belt support means in the same plane as said platen surface for supporting the facedown book and driving the book forward and backward;
   (b) providing a vacuum plenum positioned between and in the same plane as said platen surface and said belt support means, said vacuum plenum being adapted to peel a page from a first half of the facedown book as the book is transported past the vacuum plenum by said belt support means;
   (c) positioning a page flipping assist means immediately adjacent said vacuum plenum for contacting the page peeled from the book by said vacuum plenum and flattening the page against a second half of the facedown book;
   (d) providing roller means adjacent to and downstream of said page flipping assist means for engaging the lead edge of the bottommost page of the first half of the book after the lead edge has passed the roller means by a sufficient distance, said roller means being adapted to reduce friction between the pages of the book and said platen surface; and
   (e) providing a transport means for receving the book from said support belt means and transporting the book into position for copying.

12. The method of claim 11, including the step of moving said roller means at the same speed as the book.

13. The method of claim 11, including the step of moving said roller means at a slightly greater speed than the book movement speed.

14. A method for copying pages from a facedown book, comprising the steps of:
   (a) providing a platen surface for copying pages from the facedown book and a support member in the same plane as said platen surface for supporting the facedown book during forward and backward transport.
   (b) providing means for driving the book toward and away from said platen surface;
   (c) providing a vacuum plenum positioned between and in the same plane as said platen surface and said support member, said vacuum plenum being adapted to peel a page from a first half of the facedown book as the book is transported past the vacuum plenum by said belt means for driving the book;
   (d) positioning a page flipping assist means immediately adjacent said vacuum plenum for contacting the page peeled from the book by said vacuum plenum and flattening the page against a second half of the facedown book;
   (e) providing roller means adjacent to and downstream of said page flipping assist means for engaging the lead edge of the bottommost page of the first half of the book after the lead edge has passed the roller means by a sufficient distance, said roller means being adapted to reduce friction between the pages of the book and said platen surface; and
   (f) providing a transport means for receiving the book from said belt means and transporting the book into position for copying.

15. A copier adapted for copying pages from a facedown book, comprising:
   (a) a platen surface for copying pages from the facedown book and a support member in the same plane as said platen surface for supporting the facedown book during forward and backward transport;
   (b) belt means entrained around said support member for driving the book toward and away from said platen surface;
   (c) a vacuum plenum positioned between and in the same plane as said platen surface and said support member, said vacuum plenum being adapted to peel a page from a first half of the facedown book as the book is transported past the vacuum plenum by said belt means;
   (d) page flipping assist means immediately adjacent said vacuum plenum for contacting the page peeled from the book by said vacuum plenum and flattening the page against a second half of the facedown book;
   (e) roller means adjacent to and downstream of said page flipping assist means for engaging the lead edge of the bottommost page of the first half of the book after the lead edge has passed the roller means by a sufficient distance, said roller means being adapted to reduce friction between the pages of the book and said platen surface; and
   (f) transport means for receiving the book froms aid belt means and tranporting the book into position for copying.

16. The copier of claim 15, wherein the book is moved at a predetermined speed and said roller means moves at a speed equal to or slightly larger than said predetermined speed.

17. The copier of claim 16, wherein said page flipping assist means is a roller.

18. A copier adapted for copying pages from a facedown book, comprising:
   (a) an exposure platen surface for copying pages from the facedown book and a belt support means in the same plane as said exposure platen surface for supporting the facedown book during forward and backward transport;

(b) a vacuum plenum positioned between and in the same plane as said platen surface and said belt support means, said vacuum plenum being adapted to peel a page from a first half of the facedown book as the book is transported past the vacuum plenum by said belt support means;

(c) page flipping assist means immediately adjacent said vacuum plenum for contacting the page peeled from the book by said vacuum plenum and flattening the page against a second half of the facedown book;

(d) roller means adjacent to and downstream of said page flipping assist means for engaging the lead edge of the bottommost page of the first half of the book after the lead edge has passed the roller means by a sufficient distance, said roller means being adapted to reduce friction between the pages of the book and said platen surface; and (e) a tranport means for receiving the book from said belt support means and transporting the book into position for copying.

19. The copier of claim 18, wherein said page flipping assist means is a roller.

20. The copier of claim 19, wherein said vacuum plenum includes a moveable portion having vacuum ports therein and adapted such as the page is peeled from the first half of the book the obstruction of said vacuum ports causes said moveable portion of said vacuum plenum to be drawn into an open position.

21. The copier of claim 20, wherein continued peeling of the page from the first half of the book removes the page from the surface of said moveable portion of said vacuum plenum, thereby decreasing the vacuum power of said vacuum ports and allowing said moveable portion of said vacuum plenum to assume a closed position.

22. A bottom sheet feeder adapted to separate sheets individually from a moving stack, comprising:

moveable means for supporting a stack of sheets for movement between a first position and a second position;

vacuum plenum means positioned for applying a vacuum to the bottommost sheet in the stack, said vacuum plenum having a hinged surface thereof with vacuum port therein and biased into a closed position by a torsion spring such that as the stack is moved past said vacuum plenum the obstruction of sid vacuum ports by a sheet draws said hinged usrface down into an open position against the bias of said torsion spring and complete movement of the sheet stack past said vacuum plenum allows said torsion spring to close said hinged member.

23. The method of claim 2, wherein said roller means rotates and changes location after engagement with said lead edge of the bottommost page of the first half of the book, 24. The method of claim 4, wherein said transport means is rollers.

* * * * *

UNITED STATES PATENT AND TRADEMARK OFFICE
CERTIFICATE OF CORRECTION

PATENT NO. : 4,693,594

DATED : September 15, 1987

INVENTOR(S) : Gerald M. Garavuso and Troy Shinbrot

It is certified that error appears in the above-identified patent and that said Letters Patent are hereby corrected as shown below:

Title page:

In item [75], co-inventor's name should read:

Troy Shinbrot

Signed and Sealed this

Twenty-ninth Day of December, 1987

Attest:

DONALD J. QUIGG

Attesting Officer

Commissioner of Patents and Trademarks